W. H. Morris & C. L. Brown's Impt in Repeating Fire-arms.
REISSUED AUG 1 1871
RE- 4496
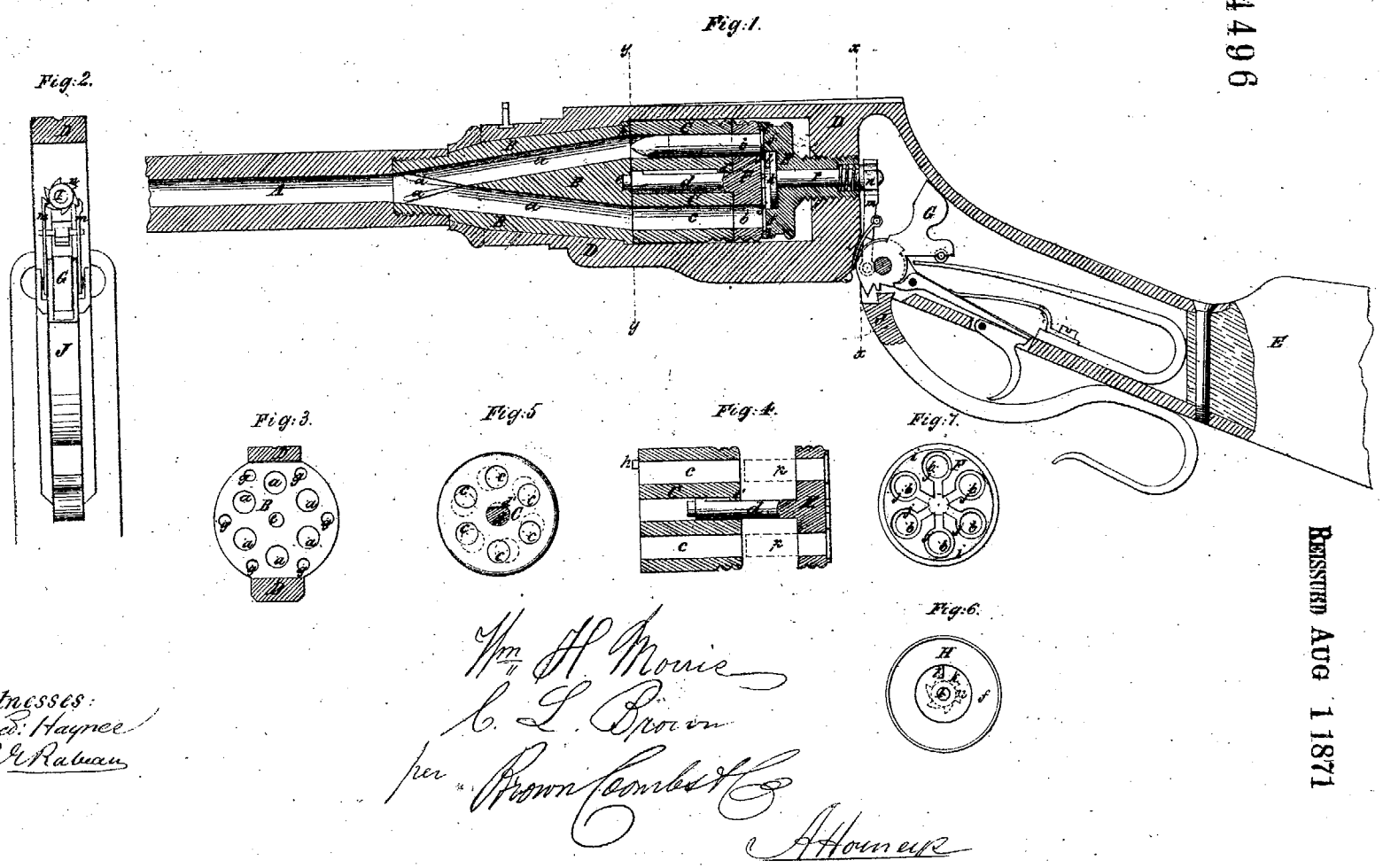
Wm H. Morris
C. L. Brown
per Brown Lamb & Co
Attorneys
Witnesses:
Fred. Haynes
R. A. Rabeau
AM. PHOTO-LITHOGRAPHIC CO. N.Y. (OSBORNE'S PROCESS.)

UNITED STATES PATENT OFFICE.

WILLIAM HOPKINS MORRIS, OF NEW YORK, AND CHARLES LISTON BROWN, OF SING SING, NEW YORK, FOR THEMSELVES, AND ROLLIN WHITE, OF LOWELL, MASSACHUSETTS, ASSIGNEE OF SAID MORRIS AND BROWN.

IMPROVEMENT IN REPEATING FIRE-ARMS.

Specification forming part of Letters Patent No. 26,919, dated January 24, 1860; reissue No. 4,496, dated August 1, 1871.

*To all whom it may concern:*

Be it known that we, WILLIAM HOPKINS MORRIS, of the city, county, and State of New York, and CHARLES LISTON BROWN, formerly of the city, county, and State of New York, but now of Sing Sing, in the county of Westchester and State of New York, have invented a new and useful Improvement in Repeating Fire-Arms; and we hereby declare that the following is a full, clear, and exact description of the same, reference being had to the accompanying drawings forming part of this specification.

This invention relates, in part, to the construction of a breech-loading fire-arm with a number of chambers for containing separate charges of powder and ball, and a barrel common to all of them, the said chambers being arranged around an imaginary prolongation of the axis of the barrel in such manner that, without any change of their positions, they are severally capable of communication by converging passages with the barrel, and the loading of the chambers at their rear or breech being provided for by an adjustable or movable breech. The invention further relates to the novel construction and application of a cartridge-shell extractor or device for withdrawing simultaneously from the several chambers of the cylinder or its equivalent, in a many-chambered fire-arm, the shells or cases of the discharged cartridges.

The invention is susceptible of many changes of construction in its details, but its several features are all illustrated by the fire-arm represented in the accompanying drawings, the description of which will now be proceeded with.

Figure 1 is a central longitudinal section of a rifle with our improvement. Fig. 2 is a transverse section in the plane indicated by the line *x x* in Fig. 1. Fig. 3 is a transverse section in the plane indicated by the line *y y* in Fig. 1. Fig. 4 is a longitudinal section of the cylinder and the plate by which the discharged cases are withdrawn. Fig. 5 is a transverse section of the cylinder. Fig. 6 is a front view of the recoil-shield and the revolving pin upon which the hammer acts to explode the charges in the cartridges. Fig. 7 is a rear view of the plate by which the discharged cartridge-cases are withdrawn.

Similar letters of reference indicate corresponding parts in the several figures.

A is a barrel with a single central bore, having attached permanently to its rear end a concentric cone-shaped piece of steel or other metal in which are several passages, *a a*, starting at equal distances apart in a circle described around the rear or base of the cone-piece from the center thereof, and converging so that all meet at the junction of the cone with the barrel and unite with the bore of the barrel, the said passages forming such an angle with the barrel as to unite with its bore without an abrupt bend. The barrel and cone-piece are secured in a stout frame, D, of iron or steel, or other metal, to which is secured the stock E, and which is of a suitable form to receive within it a cylinder, C, which is arranged with its axis in line with the common axis of the barrel and the cone-piece B, and which contains a number of chambers, *c c*, corresponding with the number of passages *a a* in the cone-piece B, said chambers being arranged parallel with the axis of the cylinder and at equal distances apart, so that each may communicate with one of the passages *a a* of the cone-piece when the cylinder is placed endwise against the rear of the cone-piece. At the end of the cylinder where the cartridges are inserted there is fitted a disk or circular plate, F, which is employed to withdraw or extract the cartridge-shells from the cylinder C. Said plate may be of the same circumference as the said cylinder, and have a similar number of holes, *b b*, similarly arranged; and to the front of this plate, or, as it may be termed, the cartridge-case extractor, there is attached a central pin or stem, *d*, which passes through a central bore in the cylinder and projects from the front thereof in the form of a journal, *e*, for the purpose of entering a bearing, *e*, provided for it in front of the cylinder or the center of the rear cone-piece B, to enable the cylinder to be arranged concentrically to the cone-piece, the cartridge-case extractor to be kept concentric with the cylinder. The pin or stem *d* is cylindrical, but flattened on one side, and the central bore of the cylinder is made of corresponding form by inserting a spline, *d'*, as shown in Figs. 3 and 4, or by any other suitable means, but the flat side of the pin or stem is so much reduced that it may turn a limited distance within, and the extractor may turn a corresponding distance relatively to the cylinder, yet not so far but that the same hole in the cartridge-extractor may always come opposite to each chamber in the cylinder, and that the holes in the extractor may always match properly with the chambers in the cylinder. In the rear face of the cone-piece B there is a number of holes, *g g*, into either one of which enters a pin, *h*, Figs. 1 and 4, that is secured to the front of the cylinder to prevent the cylinder from turning and to keep the chambers in their relative positions, so that at the time of firing any one of the charges the chamber which contains the charge as it is fired will be held in the right position to guide the ball into the bore or passage provided for it in front of the cylinder. In rear of the plate there is a screw-bolt, H, which constitutes the breech-piece, and which screws into a tapped hole in the back of the frame D, said bolt having its circular head *f*—which comes next to the plate F or cartridge-case extractor, and which constitutes a breech to the several chambers *c c* of the cylinder—made with a recess to receive within it a circular concentric projection, *i i*, on the rear of said plate. This screw-bolt, besides constituting the breech-piece, serves to force up the plate or cartridge-case extractor F close to the rear of the cylinder C and hold the cylinder C in position. By screwing the said screw-bolt back from the plate or cartridge-case extractor F the said plate and the cylinder C are permitted to be removed together from the frame D.

We propose to employ, in combination with our improvement in fire-arms, cartridges with metallic cases, around the rear of which is a flange, and which contain or carry their own fulminate priming, said cartridges being inserted in the chambers *c c* through the holes *b b* of the cartridge-case extractor F, from the rear of the latter, and being contained partly in the chambers of the cylinder and partly in the said holes *b b*, as shown in Fig. 1, where a cartridge is shown in the gun in red color, and the flanges of the cartridges being received in recesses *j j* provided for them in the rear of the extractor F. The cartridges in the several chambers are to be exploded one after another in succession by the action of the hammer G on the rear end of the revolving pin L, which is fitted to slide longitudinally, independently of, as well as to rotate with, the breech-piece H, the said pin having a broad head, K, (see Figs. 1 and 6,) on whose face there is a projecting tooth, *l*, only wide enough to strike one cartridge at a time. This pin is forced back again by a spring, *q*, after being struck up by the hammer. The said pin is caused to turn to present the tooth *l* opposite to a new cartridge, to repeat the fire, by the action upon a ratchet-wheel, *n*, on the rear end of the said pin I, of the two dogs *m m*, (see Figs. 1 and 2,) attached to a lever, J, which is employed to cock the hammer; but as we do not desire in these Letters Patent to claim the hammer, or the devices for cocking it or for exploding the cartridges, or to limit ourselves to the use of such as are shown, we will not describe them further than to say that the hammer shown operates and is cocked like that of many other fire-arms.

The operation of the gun shown in the drawings is as follows: To load, the breech-piece H is screwed back far enough to permit the removal of the cylinder C and cartridge-case extractor F from the frame D sidewise; and after removal the cartridges are inserted through the rear of the extractor F into said extractor and cylinder, which are then replaced and secured by screwing up the breech-piece H. When the cartridges are severally fired the balls pass along the passages *a a* belonging to the respective chambers and into the common central barrel, by which their flight is directed. After all the cartridges have been fired the breech-piece H is screwed back and the cylinder C and cartridge-case extractor F taken out again, and the cartridge-case extractor is drawn back far enough from the cylinder, in the manner represented in Fig. 4, to withdraw the empty cases *p p* entirely out of the cylinder, the flanges round the butts of the cartridges enabling the extractor to do this. The extractor is then, by means of the fingers of the operator or otherwise, turned a little way round to remove the cartridge-cases from opposite the chambers *c c*, as shown by the red circles in Fig. 5, and in this position it is pushed forward again; and the front ends of the cases *p p* then coming in contact with the rear of the cylinder are stopped, while the plate moves up to the cylinder, and are thus forced through the back of the plate, so that they will drop out or can be easily pushed out by the fingers.

If preferred, the chambers themselves may converge toward the barrel like the passages *a a*. Also, instead of making the cylinder or chambers movable, as in the gun represented, the chambers C may be permanently stationary, and the loading and withdrawal of exploded cartridges effected through an opening provided in the back of the frame D or its equivalent.

Having described our invention, we will proceed to state what we claim as new and desire to secure by Letters Patent:

1. In combination with a many-chambered cylinder, having its chambers extending right through it, a movable breech or its equivalent for the purpose of adjusting and holding the cylinder in its desired position, substantially as herein set forth.

2. The arrangement and combination of the revolving pin I, bolt or breech-piece H, hammer G, and cartridge-shell extractor F, substantially as herein described.

3. The combination, with a single barrel and a circular series of chambers for containing separate charges of powder and ball, of a corresponding series of passages, *a a*, starting from the said chambers and converging so as to discharge into the barrel, substantially as and for the purpose herein set forth.

4. In combination with a many-chambered cylinder, a cartridge-shell ejector to withdraw simultaneously two or more cartridge-shells from the cylinder, substantially as and for the purpose herein set forth.

5. In combination with a many-chambered cylinder, either movable or fixed, a cartridge-shell extractor having a pin or stem entering the cylinder and extending through the same, substantially as herein described.

6. In combination with a many-chambered cylinder and a cartridge-shell extractor fitted thereto with a pin or stem, the fitting of the pin or stem into the cylinder with a flat and spline or their equivalent, substantially as and for the purpose herein set forth.

WM. H. MORRIS.
C. L. BROWN.

Witnesses as to WM. H. MORRIS:
FRED HAYNES,
R. E. RABEAU.
Witnesses as to C. L. BROWN:
OSCAR RESSEGINE,
JOAKIM URMY.